Jan. 17, 1939.  K. W. HALLDEN  2,144,307
ADJUSTABLE DRIVE
Filed March 3, 1936
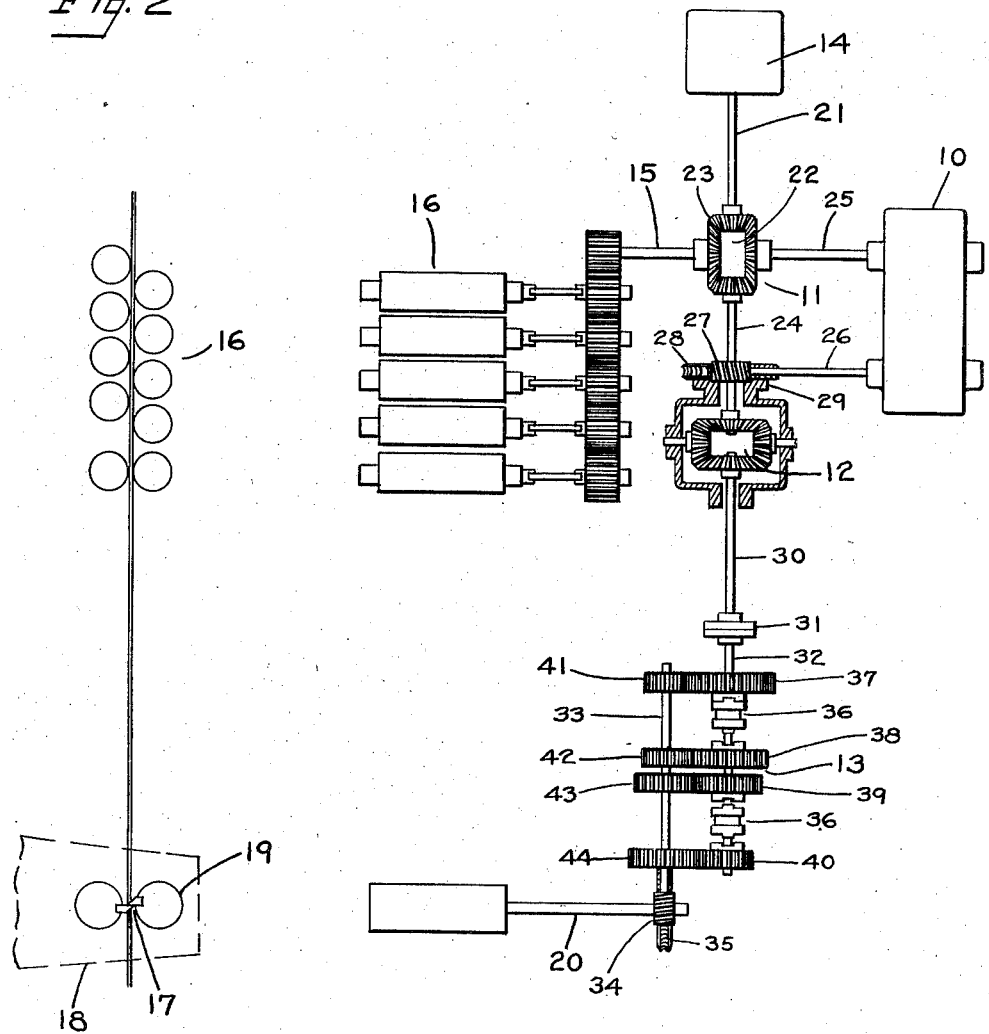
Karl W. Hallden INVENTOR.
BY Louis M. Schmidt
ATTORNEY Patented Jan. 17, 1939

2,144,307

UNITED STATES PATENT OFFICE 2,144,307

ADJUSTABLE DRIVE

Karl William Hallden, Thomaston, Conn.

Application March 3, 1936, Serial No. 66,879

3 Claims. (Cl. 74—328)

My invention relates to improvements in adjustable drives or variable speed and speed governor combinations as applied to a condition in which two shafts are driven from a common source of supply, as for instance in a cutting-off machine the one shaft for feeding the stock and the other for effecting the cutting, and, assuming the two shafts to be subject to planned relative variations in speed for effecting different lengths of cut-off, and my improvement, as to the object thereof, has to do with the providing of means for effecting gradations or variations that are infinitesimal throughout the range provided, as distinct from step-by-step gradations; that involves the use of a variable-speed device of the most accurate form and most positive obtainable; in which the said device is utilized as a governor for the system and by restricting the power transmitted therethrough to a fraction only of the total, and restricting the governing range to a fraction of the entire range that is provided; and in which selected gearing is provided in combination with the means mentioned and supplemental thereto for completing the desired range of variations.

In the accompanying drawing:—

Figure 1 is a diagrammatic plan view of one form of my improved variable speed and speed governor combination, as applied in one embodiment of my invention, to a rotary shear for cutting sheet metal into various lengths.

Fig. 2 is a skeleton elevational view showing the straightening and feed rolls arranged to feed sheet metal stock to the rotary cutter.

My improved adjustable drive or variable speed and speed governor combination is here shown as applied to a rotary shear and as thus applied may be specifically designated as length control mechanism and in which is incorporated the distinctive governing means. More broadly the invention may be designated as shaft control means for changing and regulating the rate of revolution of a particular shaft in relation to some source of power, such as an electric motor. One condition in which the invention fits is such as comprises two shafts driven from a common motor, with infinitesimally-adjustable mechanism interconnecting the two shafts to permit of securing any desired relative speed relation between the shafts.

The invention makes use of a variable speed or infinitesimally-adjustable speed-ratio unit 10 as the part that I designate as the governor and the device used is known as the PIV (positive, infinite, variable) built by the Link-Belt Company of Philadelphia, Pennsylvania. Any other form of unit may be employed provided it may be described as accurate and is not subject to variation on account of differences in temperature or changes in load or speed. Devices using liquid and the like are subject to too much variation.

Variable speed infinitesimally-adjustable units having the requisite characteristics are not available in the higher range of power capacity frequently required, the present limit being about fifteen horse power. By the method herein described a unit having a rating of ten horse power can be used and is used to serve as the governor to control a power delivery of one hundred and two hundred horse power.

Variable speed infinitesimally-adjustable units generally are not adapted to withstand sudden shocks in the transmission of power. In the arrangement to be described the effects of such shocks and the like are minimized.

The variable speed or infinitesimally-adjustable speed-ratio unit 10 is not used directly to transmit the power that is used but is used indirectly. The governor group 11 comprises besides the unit 10 a differential gear unit 12 and by the use thereof only a relatively small portion is transmitted through the unit 10.

The governor group 11 is supplemented by a change-gear group or unit 13 for obtaining the desired range of operations. Said change-gear group or unit provides for step-by-step gradations, providing changes in relatively large steps or jumps. The governor group 11 provides for infinitesimal gradations.

Inaccuracies in the governor itself are smoothed out by the arrangement employed.

Referring now to the particular form of the invention illustrated, which shows application to the rotary shear, the motor 14 provides the power, part of which is delivered to the shaft 15 for effecting the feeding of the stock, in the form of sheet metal, through the medium of the feed and straightening unit 16 that comprises the usual group of rolls. The stock is fed between the blades 17 of the rotary shear 18, the blades being mounted on the drums 19.

The other part of the power effects the rotation of the shaft 20 that operates the drums 19.

The problem presented in the particular construction illustrated in the drawing, is the control of shaft 20, the rate of feed being maintained constant. Specifically, a change between twenty revolutions per minute and double, or forty revolutions per minute is selected as sufficing for practical purposes. For extending the range beyond the two-to-one ratio other plans are followed, such as the provision for mis-cut.

Also, a PIV unit is selected that has a 5:1 ratio, with speeds ranging between 200 and 1000 revolutions per minute.

Considering details, the motor drive shaft 21 that enters gear nest 22 that comprises a set of bevel gears 23. At the opposite end of the gear nest 22 is differential input shaft 24 that enters the differential gear unit 12.

Branching laterally from the gear nest 22 on one side is shaft 15 already mentioned that drives the stock feeding unit 16. On the opposite side is shaft 25 that enters and drives the governor or variable speed unit 10. The delivery shaft 26 of the unit 10 drives a worm 27 that serves to drive a worm wheel 28 and which is mounted on the housing 29 of the differential unit 12 for the purpose of rotating the same.

The combined direct and indirect drive means described cooperate in driving the shaft 30 that emerges from the differential unit 12.

The coupling 31 connects the differential output shaft 30 with shaft 32 that enters the change-gear unit 13.

By means of selective gear means shaft 32 drives the auxiliary shaft 33 that carries a worm 34. The latter drives worm gear 35 that is mounted on the rotary shear shaft 20.

Sliding clutch devices 36 on shaft 32 can be manipulated for selectively connecting gears 37, 38, 39 and 40 on said shaft 32 with gears 41, 42, 43, and 44 on shaft 33.

Values will now be applied.

The motor will be assumed to drive the shafts that emerge from the gear nest 22 at a constant speed of 200 revolutions a minute, comprising shaft 15 for the feed, shaft 24 that drives one branch of the drive for the cutting through the differential gear unit 12, and shaft 25 that delivers through the infinitesimally-adjustable speed-ratio unit 10. Shaft 24 may be said to drive directly and shaft 25 indirectly.

After being adjusted to deliver sheets of definite length the two drives for cut-off cooperate one with the other and with the feed delivery to effect a smooth and accurate operating condition, the cutting for the successive lengths being within one-sixty-fourth of an inch in accuracy.

The adjustment as to length is without limit as to fineness within the range provided by the association of the variable sped device and the differential.

This range is but a fraction of the total range for the machine, provision for the major portion of which is made by the use of the change-gear group or unit 13 and the worm 34 and worm gear 35. Changes by the use of the gears are made in steps that are equal to that provided by the governor group and the successive changes are equal in effect.

Considering drive shaft 24, without any governing, the differential housing 29 being held stationary, shaft 30 emerging from the differential is driven at the same speed as said shaft 24 in the reverse direction.

The basis assumed is a stock feed of one-hundred feet per minute. The parts are adjusted and arranged so as to provide a speed of forty revolutions per minute for the cutter shaft 20. Shaft 26 driven by the variable speed device has its minimum speed of 200 revolutions per minute. Gears 37 and 41 are connected. This constitutes the initial setting. The differential housing 29 is being revolved in the same direction as the entering shaft 24. An operating condition has been set forth, involving the maximum speed determined upon for the cutter shaft.

An increase in cutter speed can be obtained by reversing the differential housing, a practice that could be provided for if desired.

With the setting described, with a cutting at each revolution of the cutters, the length of cut would be two and one-half feet, corresponding to a rate of forty per minute for the cutter shaft. The ultimate provided for is double, five feet at twenty per minute. This latter as provided for is attained by changing the gears, and may be reached at once or in successive changes of respectively five revolutions per minute. During any and all of these conditions, especially for minute changes in revolutions and the corresponding changes in length of cut-off the variable speed device is functioning and operates as branch drive means. Only a small part of the power goes therethrough, and all except for friction losses goes back into the final drive.

Considering more specifically the operation of the variable speed device or governor, with a range of 5:1 the initial delivery speed of two hundred can be stepped up to 1000 revolutions per minute, which will provide for a drop from 40 to 35 for shaft 20. Also, the utility of the device is emphasized by the fact that it is adapted to positively provide for any subdivision between the 40 and 35 mentioned.

Thus, in a similar manner, gears 38 and 42 provide for a drop from 35 to 30; gears 39 and 43 for a drop from 30 to 25; and finally, gears 40 and 41 for a drop from 25 revolutions a minute to twenty, the variable speed device in each case playing a vital part in effecting the ultimate result.

The variable speed unit in being adjusted between 200 and 1000 revolutions per minute, ties up the one pair of gears to the next in each of the stages as set forth.

The mechanism described serves as merely one instance of the utility of the invention and the specific mechanism may properly be designated as length control mechanism. The combination shows how a variable speed device of relatively small capacity may be made to function not only for controlling a range both as to the load and to the quantity of speed change beyond its rated capacity but likewise beyond the range available in such devices.

The principle involved is likewise applicable in situations other than the field of cutting-off machines and the like, such as types of machines that require control of the speed of revolution of a shaft by infinitesimally-small changes of speed in relation to some source of power.

I claim as my invention:—

1. A precision adjustable-drive, comprising: drive-means; two driven shafts driven by said drive-means; and precision infinitesimally-adjustable means interconnecting said two driven shafts and including, a change-gear unit having a plurality of selectively-engageable pairs of change gears of different speed-ratios differing by relatively-large steps, a differential-gear unit having a differential output-shaft, and a presettable infinitesimally-adjustable speed-ratio unit having a rotatable mechanical-drive connection with said differential-gear unit and adapted to rotate said connection uninterruptedly to operatively control the speed of rotation of said differential output-shaft and having an infinitesimally-adjustable speed-ratio range at least equal to the speed-ratio range between each two successive speed-ratios provided by said pairs of change-gears and designed and adapted to be set to give and maintain any desired predetermined speed-ratio between each two successive speed-ratios provided by said pairs of change-gears; said change-gear unit, differential-gear unit and infinitesimally-adjustable speed-ratio unit together forming means designed and adapted to provide a continuous precision infinitesimally-adjustable range of speed-ratios between said two driven shafts, over the whole range of steps provided by said pairs of change-gears.

2. A precision adjustable-drive, comprising: drive-means; two driven shafts driven by said drive-means; and precision infinitesimally-adjustable means interconnecting said two driven shafts and including, a change-gear unit having a plurality of selectively-engageable pairs of change-gears of different speed-ratios differing by relatively-large steps, a differential-gear unit having a differential output-shaft, and a presettable infinitesimally-adjustable speed-ratio unit having a rotatable mechanical-drive connection with said differential-gear unit and adapted to rotate said connection uninterruptedly to operatively control the speed of rotation of said differential output-shaft and having an infinitesimally-adjustable speed-ratio range at least equal to the speed-ratio range between each two successive speed-ratios provided by said pairs of change-gears and designed and adapted to be set to give and maintain any desired predetermined speed-ratio between each two successive speed-ratios provided by said pairs of change-gears; said change-gear unit, differential-gear unit and infinitesimally-adjustable speed-ratio unit together forming means designed and adapted to provide a continuous precision infinitesimally-adjustable range of speed-ratios between said two driven shafts, over the whole range of steps provided by said pairs of change-gears, and said change-gear unit being operatively interposed between said differential-gear unit and one only of said two driven shafts and driven by said differential output-shaft.

3. A precision adjustable-drive, comprising: drive-means; two driven shafts driven by said drive-means; and precision infinitesimally-adjustable means interconnecting said two driven shafts and including, a change-gear unit having a plurality of selectively-engageable pairs of change-gears of different speed-ratios differing by relatively-large steps, a differential-gear unit having a differential output-shaft, and a presettable infinitesimally-adjustable speed-ratio unit having a rotatable mechanical-drive connection with said differential-gear unit and adapted to rotate said connection uninterruptedly and at substantially-uniform angular speed at any adjustment of said infinitesimally-adjustable speed-ratio unit to operatively control the speed of rotation of said differential output-shaft and having an infinitesimally-adjustable speed-ratio range at least equal to the speed-ratio range between each two successive speed-ratios provided by said pairs of change-gears and designed and adapted to be set to give and maintain any desired predetermined speed-ratio between each two successive speed-ratios provided by said pairs of change-gears; said change-gear unit, differential-gear unit and infinitesimally-adjustable speed-ratio unit together forming means designed and adapted to provide a continuous precision infinitesimally-adjustable range of speed-ratios between said two driven shafts, over the whole range of steps provided by said pairs of change-gears.

KARL WILLIAM HALLDEN.